April 28, 1959     O. M. WHITTEN     2,884,291

SEALING CUP

Filed Oct. 5, 1953

INVENTOR.
OWEN M. WHITTEN.

BY

United States Patent Office 2,884,291
Patented Apr. 28, 1959

2,884,291
SEALING CUP

Owen M. Whitten, Detroit, Mich., assignor to Kelsey-Hayes Company, a corporation of Delaware Application October 5, 1953, Serial No. 383,965

4 Claims. (Cl. 309—23)

The invention relates to sealing cups and refers more particularly to flexible sealing cups for use in hydraulic mechanisms.

The invention has for one of its objects the provision of an improved flexible sealing cup constructed to maintain an effective seal and have long life.

The invention has for another object to provide a flexible sealing cup which, in the natural state, has a lip with its outer surface flared in a direction away from the base, the free end of the lip being frusto-conical with its surface in the surface of a cone having its apex in the axis of the cup axially beyond the free end at the side of the free end opposite the base whereby, in the assembled state, with the outer surface of the lip substantially cylindrical, the radially inner edge of the free end of the lip extends axially beyond the radially outer edge of the free end of the lip at the side of the free end opposite the base.

Other objects of the invention will become more fully apparent from the following description taken in connection with the accompanying drawings in which—

Figure 1:
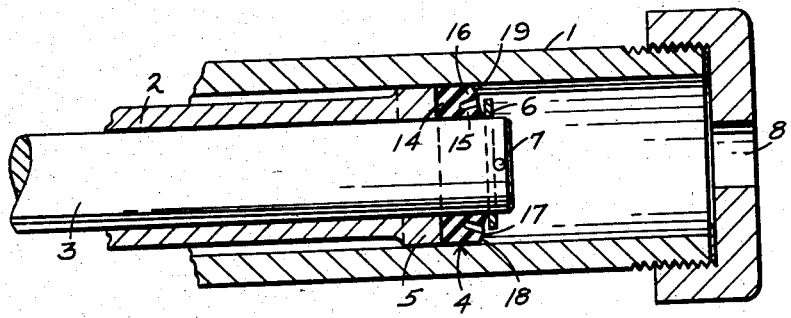
Figure 1 is a longitudinal section of a hydraulic mechanism showing the flexible sealing cup embodying the invention in its assembled state.

As illustrated in Figure 1, the hydraulic mechanism is a fluid pressure producing device having the cylinder 1 and the concentric outer and inner plungers 2 and 3 reciprocable within the cylinder. 4 is the flexible sealing cup between the cylinder and inner plunger, and 5 is an enlargement at the end of the outer plunger slidably engaging the cylinder and forming a backing for the sealing cup. The sealing cup encircles the inner plunger and is held from accidental disengagement from the inner plunger by suitable means, such as the washer 6 and the cross pin 7. The inner plunger is adapted to be moved axially relative to the outer plunger and both plungers are adapted to be moved forwardly in unison to force liquid from the cylinder through its outlet port 8.

Figure 2:
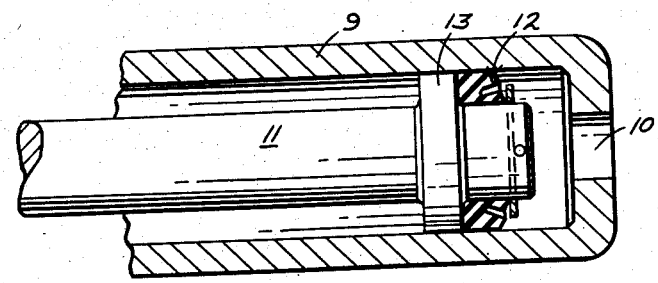
Figure 2 is a similar view of a modified construction of hydraulic mechanism showing the sealing cup.

Figure 2 illustrates a modified construction of hydraulic mechanism having the cylinder 9 provided with the liquid inlet port 10, the plunger 11 reciprocable within the cylinder, the flexible sealing cup 12 between the cylinder and the plunger and the enlargement 13 slidably engaging the cylinder and integral with the plunger and forming a backing for the sealing cup. The sealing cup 12 encircles the plunger and is held from accidental disengagement from the plunger in the same manner as the sealing cup 4. Upon entrance of liquid under pressure into the cylinder through the inlet port, the plunger and sealing cup are forced forwardly as a unit.

Figure 3:
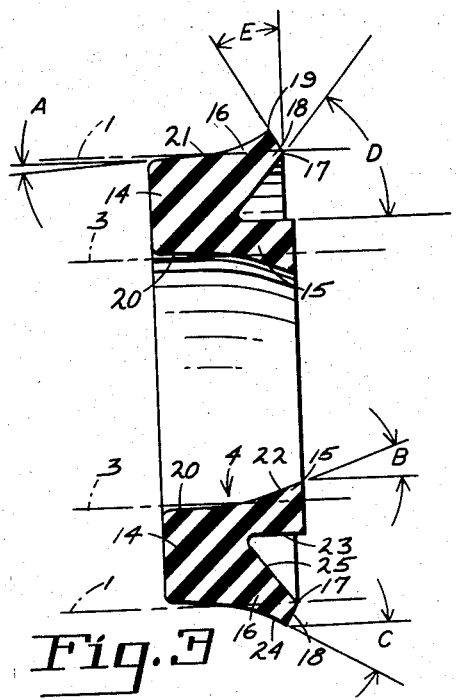
Figure 3 is a diametral cross-section of the sealing cup in its natural state.

The flexible sealing cups 4 and 12 are alike and, therefore, the sealing cup 4 will be described. This cup is formed of rubber which, in the present instance, is synthetic and has the circular base 14 and the concentric inner and outer lips 15 and 16, respectively, which extend in one direction from the base and are adapted to form seals with the cylindrical surfaces of the plunger 3 and cylinder 1, respectively. The radially inner edge 17 of the free end 18 of the outer lip 16 extends axially beyond the radially outer edge 19 of the free end at the side of the free end opposite the base in the assembly. The sealing cup in its natural state, as illustrated in Figure 3, has the radially inner surface 20 of its base 14 cylindrical and of a size very slightly in excess of the diameter of the plunger 3, and also has the radially outer surface 21 of its base flared in the direction of the lips at a relatively small angle A of approximately 4°. The radially inner surface 22 of the inner lip 15 is tapered in a direction away from the base and at an angle B of approximately 20° to the axis of the cup and the two radially inner surfaces 20 and 22 are connected by an arcuate surface. The radially outer surface 23 of the inner lip is substantially cylindrical. The radially outer surface 24 of the outer lip 16 is flared in a direction away from the base at an angle C of approximately 30° to the axis of the cup and has a maximum diameter slightly greater than the diameter of the inner cylindrical surface of the cylinder 1. The radially inner surface 25 of the outer lip is flared at a greater angle than that of the radially outer surface 24, the angle D being approximately 51°. The free end of the outer lip is frusto-conical with its surface in the surface of a cone having its apex in the axis of the cup beyond the free end at the side of the free end opposite the base and, for best results, the angle E between the free end and a line at right angles to the axis of the cup is within a range of approximately 25° to approximately 45°.

What I claim as my invention is:

1. A flexible sealing cup between concentric radially inner and outer cylindrical surfaces comprising a circular base and radially spaced inner and outer annular lips extending from said base in one direction generally axially thereof and adapted to engage and form seals respectively with the inner and outer cylindrical surfaces, said outer lip in the natural state of said sealing cup having radially inner and outer surfaces flared radially outwardly in a direction away from said base and having a frusto-conical free end with its surface in the surface of a cone having its apex in the axis of the cup axially beyond said free end at the side thereof opposite said base, the angle between said free end and a plane at right angles to the axis of the cup and passing through the radially inner edge of said free end being within a range of approximately 25° to approximately 45° in the natural state of the cup, the angle between the outer surface of said outer lip and the axis of the cup being approximately 30° and the angle between the inner surface of said outer lip and the axis of the cup being approximately 51° in the natural state of the cup, the radially inner edge of the free end of said outer lip extending axially beyond the radially outer edge of said free end at the side thereof opposite said base when said sealing cup is in the assembled state with said free end forming a substantial obtuse angle and with the outer surface of said outer lip substantially cylindrical and sealingly engaging the outer cylindrical surface.

2. A flexible sealing cup between concentric radially inner and outer cylindrical surfaces comprising a circular base and radially spaced inner and outer annular lips extending from said base in one direction generally axially thereof and adapted to engage and form seals respectively with the inner and outer cylindrical surfaces, said outer lip in the natural state of said sealing cup having radially inner and outer surfaces flared radially outwardly in a direction away from said base and having a frusto-conical free end with its surface in the surface of a cone having its apex in the axis of the cup axially beyond said free end at the side thereof opposite said base, the angle between said free end and a plane at right angles to the axis of the cup and passing through the radially inner edge of said free end being within a range of approximately 25° to approximately 45° in the natural state of the cup, the angle between the outer surface of said outer lip and the axis of the cup being approximately 30° and the angle between the inner surface of said outer lip and the axis of the cup being approximately 51° in the natural state of the cup, the radially inner edge of the free end of said outer lip extending axially beyond the radially outer edge of said free end at the side thereof opposite said base when said sealing cup is in the assembled state with said free end forming a substantial obtuse angle and with the outer surface of said outer lip substantially cylindrical and sealingly engaging the outer cylindrical surface, the radially outer surface of said base flaring toward said outer surface of said outer lip at an angle of approximately 4° in the natural state of the cup and connected thereto by an arcuate surface, in the assembled state of the cup the radially outer surface of said base being substantially cylindrical and sealingly engaging the outer cylindrical surface.

3. A flexible sealing cup between concentric radially inner and outer cylindrical surfaces comprising a circular base and radially spaced inner and outer annular lips extending from said base in one direction generally axially thereof and adapted to engage and form seals respectively with the inner and outer cylindrical surfaces, said outer lip in the natural state of said sealing cup having radially inner and outer surfaces flared radially outwardly in a direction away from said base and having a frusto-conical free end with its surface in the surface of a cone having its apex in the axis of the cup axially beyond said free end at the side thereof opposite said base, the angle between said free end and a plane at right angles to the axis of the cup and passing through the radially inner edge of said free end being within a range of approximately 25° to approximately 45° in the natural state of the cup, the angle between the outer surface of said outer lip and the axis of the cup being approximately 30° and the angle between the inner surface of said outer lip and the axis of the cup being approximately 51° in the natural state of the cup, the radially inner edge of the free end of said outer lip extending axially beyond the radially outer edge of said free end at the side thereof opposite said base when said sealing cup is in the assembled state with said free end forming a substantial obtuse angle and with the outer surface of said outer lip substantially cylindrical and sealingly engaging the outer cylindrical surface, the radially outer surface of said base flaring toward said outer surface of said outer lip at an angle of approximately 4° in the natural state of the cup and connected thereto by an arcuate surface, in the assembled state of the cup the radially outer surface of said base being substantially cylindrical and sealingly engaging the outer cylindrical surface, the angle between the radially inner surface of said inner lip and the axis of the cup being approximately 20° in the natural state of the cup and being substantially cylindrical in the assembled state of the cup and sealingly engaging the inner cylindrical surface.

4. A flexible sealing cup between concentric radially inner and outer cylindrical surfaces comprising a circular base and radially spaced inner and outer annular lips extending from said base in one direction generally axially thereof and adapted to engage and form seals respectively with the inner and outer cylindrical surfaces, said outer lip in the natural state of said sealing cup having radially inner and outer surfaces flared radially outwardly in a direction away from said base and having a frusto-conical free end with its surface in the surface of a cone having its apex in the axis of the cup axially beyond said free end at the side thereof opposite said base, the angle between said free end and a plane at right angles to the axis of the cup and passing through the radially inner edge of said free end being within a range of approximately 25° to approximately 45° in the natural state of the cup, the radially inner edge of the free end of said outer lip extending axially beyond the radially outer edge of said free end at the side thereof opposite said base when said sealing cup is in the assembled state with said free end forming a substantial obtuse angle and with the outer surface of said outer lip substantially cylindrical and sealingly engaging the outer cylindrical surface.

References Cited in the file of this patent
UNITED STATES PATENTS

| | | |
|---|---|---|
| 2,067,499 | Millmine | Jan. 12, 1937 |
| 2,283,460 | Pumphrey | May 19, 1942 |
| 2,293,564 | Schnell | Aug. 18, 1942 |
| 2,571,538 | Christenson | Oct. 16, 1951 |
| 2,601,085 | Brunner | June 17, 1952 |
| 2,672,359 | Fisher | Mar. 16, 1954 |
| 2,677,581 | Taylor | May 4, 1954 |